United States Patent
Ji et al.

(10) Patent No.: US 8,754,784 B2
(45) Date of Patent: Jun. 17, 2014

(54) SYSTEM FOR PROVIDING PARKING INFORMATION BASED ON DUAL WIRELESS COMMUNICATION AND METHOD THEREOF

(75) Inventors: Sang Woo Ji, Gyeonggi-do (KR); Jun Hyeong Lee, Gyeonggi-do (KR); Hyun Cheol Bae, Gyeonggi-do (KR); Hun Joung Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 261 days.

(21) Appl. No.: 13/172,488

(22) Filed: Jun. 29, 2011

(65) Prior Publication Data

US 2012/0139757 A1    Jun. 7, 2012

(30) Foreign Application Priority Data

Dec. 6, 2010    (KR) ........................ 10-2010-0123823

(51) Int. Cl.
*G08G 1/14*    (2006.01)

(52) U.S. Cl.
USPC ............................. 340/932.2; 340/933; 701/1

(58) Field of Classification Search
USPC ......... 340/932.2, 933; 455/422.1; 701/400, 1, 701/423, 454
See application file for complete search history.

(56) References Cited

U.S. PATENT DOCUMENTS

| | | | | |
|---|---|---|---|---|
| 7,893,847 | B2* | 2/2011 | Shanbhag et al. | 340/932.2 |
| 2005/0280555 | A1* | 12/2005 | Warner, IV | 340/932.2 |
| 2006/0033641 | A1* | 2/2006 | Jaupitre et al. | 340/932.2 |
| 2006/0267799 | A1* | 11/2006 | Mendelson | 340/932.2 |
| 2007/0135114 | A1* | 6/2007 | Valentino | 455/422.1 |
| 2011/0241898 | A1* | 10/2011 | Busch | 340/932.2 |

FOREIGN PATENT DOCUMENTS

| | | |
|---|---|---|
| JP | 2010114740 A | 5/2010 |
| KR | 10-2002-0092669 | 12/2002 |
| KR | 10-2006-0117698 | 11/2006 |
| KR | 10-2007-0040021 | 4/2007 |
| KR | 10-2007-0042029 | 4/2007 |
| KR | 10-2009-0039350 | 4/2009 |
| WO | 2006087503 A1 | 8/2006 |

\* cited by examiner

*Primary Examiner* — Toan N Pham
(74) *Attorney, Agent, or Firm* — Edwards Wildman Palmer LLP; Peter F. Corless (57) ABSTRACT

A system for providing parking information based on dual wireless communication including a vehicle terminal configured to connect to a server via a first wireless communication network when a parking information request is generated, and configured to connect to the server via a second wireless communication network if a connection via the first wireless communication network is failed, thereby receiving and displaying the parking information on a screen.

11 Claims, 8 Drawing Sheets

| LEVEL | AVAILABLE SPACES/TOTAL SPACES |
|---|---|
| B1 | 25/70 |
| B2 | 35/75 |
| B3 | 40/75 |
| B4 | 75/80 |

SYSTEM FOR PROVIDING PARKING INFORMATION BASED ON DUAL WIRELESS COMMUNICATION AND METHOD THEREOF

CROSS-REFERENCES TO RELATED APPLICATIONS

Priority to Korean patent application number 10-2010-0123823, filed on Dec. 6, 2010 which is incorporated by reference herein in its entirety, is claimed.

BACKGROUND OF THE INVENTION

1. Field of the Invention

The present invention relates to a method and a system for providing parking information based on dual wireless communication, and more particularly, to a technology for providing parking information to a vehicle by selectively using, for example, code division multiples access (CDMA) and WiFi.

2. Description of the Related Art

As the use of vehicles become widespread, in a heavily congested area or building, parking is extremely limited and drivers suffer from a serious lack of parking spaces.

Nonetheless, vehicles are allowed to enter into a parking structure and instructed to follow signs. However, the signs are only useful for indicating a direction and do not notify a driver of parking space availability. Therefore, drivers do not have advance information on whether the parking structure is full or not before they enter the structure. Thus, the drivers who are seeking a space are often compelled to repeatedly circle the parking structure while waiting for a space to become available.

Particularly in case of a big shopping mall or a department store, which attract many customers, drivers often have to spend an unnecessary and excessive amount of time in the parking lot or parking structure to locate an open parking space.

SUMMARY OF THE INVENTION

The present invention provides parking information to a driver by selectively using code division multiples access (CDMA) and WiFi.

In accordance with an aspect of the present invention, provided is a system for providing parking information based on dual wireless communication. More specifically, a vehicle terminal is configured to connect to a server via a first wireless communication network when a parking information request is generated. Additionally, the vehicle terminal is also configured to connect to the server via a second wireless communication network if a connection via the first wireless communication network has failed, thereby receiving and displaying the parking information on a screen to a driver.

The first wireless communication may be a code division multiples access (CDMA) and the second wireless communication may be a WiFi or WiBro. In particular, the vehicle terminal has a wireless communication unit configured to perform wireless communication with the server via at least one of CDMA, WiFi or WiBro; a control unit configured to perform a handover to the at least one of CDMA, WiFi or WiBro; and a display unit configured to display on a screen parking information received from the server.

The parking information may include announcement information, parking information pertaining to each level, and detailed information of a selected level listed in the parking information pertaining to each level. The detailed information is divided into a plurality of subsections and the display unit is configured to display an enlarged view of a subsection selected by a user. The announcement information includes an address of a parking site, a total number of spaces, a service provider and event information. In the detailed information of the selected level, an available parking space is marked as a first color, e.g., white and an occupied parking space is marked as a second color, e.g., red. The server determine, upon receiving the parking information request from the vehicle terminal, whether a user is a subscriber to a parking information service.

In accordance with another aspect of the present invention, provided is a method of providing parking information based on dual wireless communication. In particular, the method initiates by sending a request for parking information to a server via a first wireless communication network when a parking information request is generated. Then the request for the parking information is sent to the server via a second wireless communication network if a connection via the first wireless communication network is determined to have failed. Upon receiving the parking information from the vehicle information cantor or the parking control server, the parking information is displayed on a screen.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, a method and a system for providing parking information based on dual communication according to the present invention will be described with reference to FIGS. 1 through 7B.

In the present invention, the parking information is given herein as example information that is provided to a vehicle based on dual wireless communication; however, it should be understood that the present invention is not limited to the parking information but includes any vehicle related information such as traffic information or living information.

Figure 1:
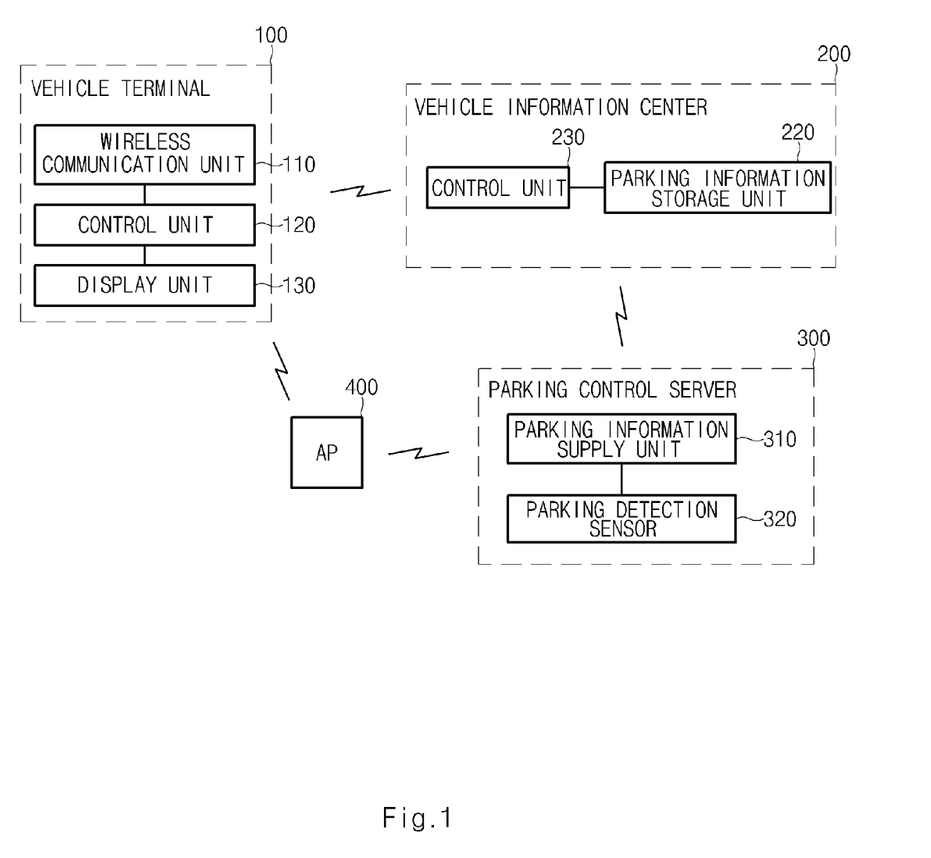
FIG. 1 is a view illustrating a configuration of a system for providing parking information based on dual wireless communication according to an exemplary embodiment of the present invention.

FIG. 1 is a view illustrating a configuration of a system for providing parking information based on dual wireless communication according to an exemplary embodiment of the present invention.

Figure 2:
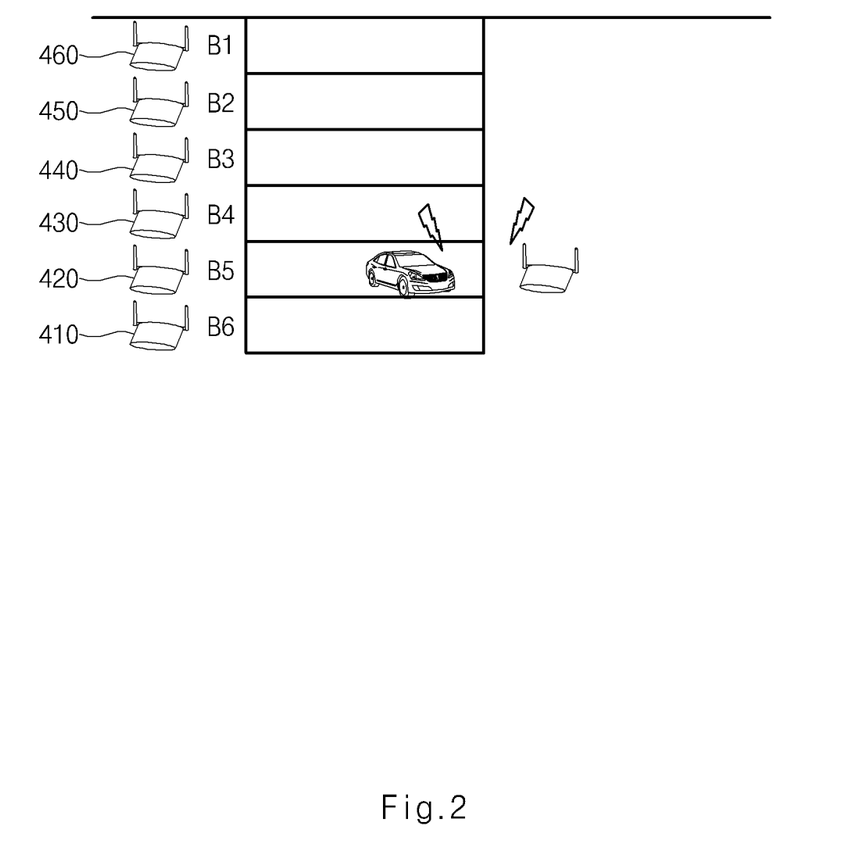
FIG. 2 is a view for explaining an example of a system for providing parking information based on dual wireless communication using WiFi.

The system for providing parking information based on dual wireless communication according to the present invention includes a vehicle terminal 100 mounted within a vehicle, a vehicle information center 200, and a parking control server 300. Here, the vehicle terminal 100, the vehicle information center 200, and the parking control server 300 are connected to one another via wireless communication (e.g., CDMA or WiFi). The vehicle information center 200 and the parking control server 300 can also be configured to be connected via internet. In this case, as shown in FIG. 2, access points (APs) 410 to 460 are installed at each level of a parking structure to connect to the vehicle terminal 100 of the vehicle.

The vehicle terminal 100 includes, for example, a telematics terminal. The vehicle terminal 100 requests and receives parking information from the vehicle information center 200 via CDMA when a parking information request is generated. When CDMA connection is not available, the vehicle terminal 100 is connected to an AP 400 to request the parking information from the parking control server 300 via WiFi and receive the parking information accordingly. In addition, the vehicle terminal 100 displays the received parking information on a screen so that a user may identify an available spot in the parking structure that are available.

To this end, in the exemplary embodiment of the present invention, the vehicle terminal 100 includes a wireless communication unit 110, a control unit 120 and a display unit 130. The wireless communication unit 110 includes respective modules for performing wireless communication networking such as, for example, CDMA, WiFi or WiBro. The control unit 120 performs a handover to a WiFi network when CDMA communication is not available and controls the display unit 130 to display the parking information received from the vehicle information center 200 or the parking control server 300.

Figure 5:
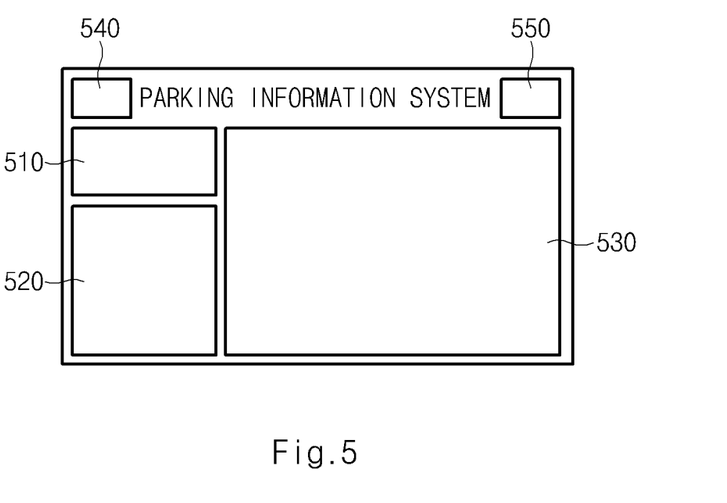
FIG. 5 illustrates an example of a parking information service screen.
Figure 6A:
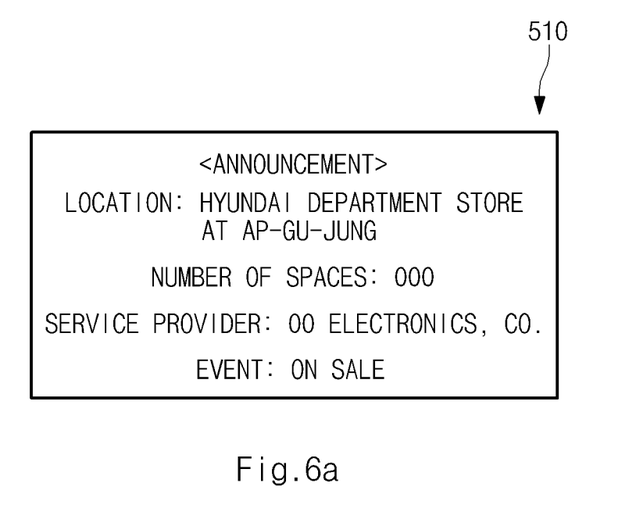
FIGS. 6A through 6E illustrate detailed examples of sub-screens of the parking information service screen in FIG. 5.
Figure 6B:
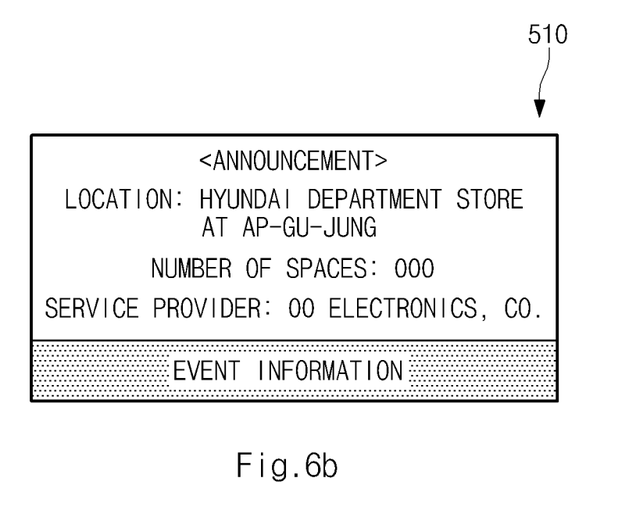

The display unit 130 displays the parking information under a control of the control unit 120. Here, the parking information can be displayed through, for example, five subscreens as shown in FIG. 5. The five subscreens can include an announcement screen, a screen for parking information of each level, a detailed screen, an information service screen, and/or an on/off button screen. As shown in FIG. 6A, the announcement screen 510 includes information of a building in which the parking structure is located such as a name, a total number of spaces, a service provider, event information and sale information. Here, as shown in FIG. 6B, when there exist a plurality of information related to the parking structure, a user may click one of the listings, e.g., the 'event information' to link to a pop up window that shows detailed information thereof.

Figure 6C:
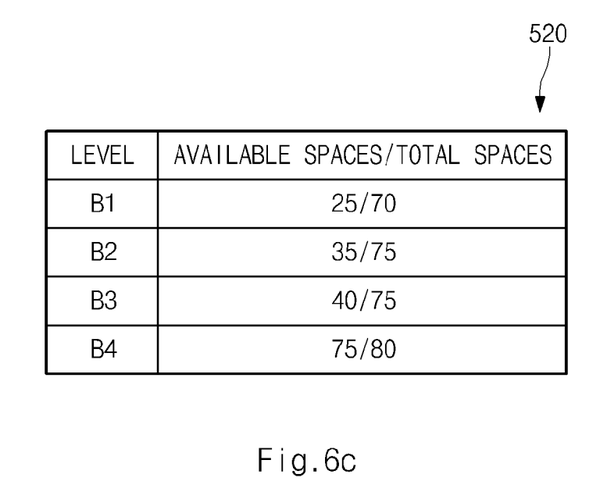
Figure 6D:
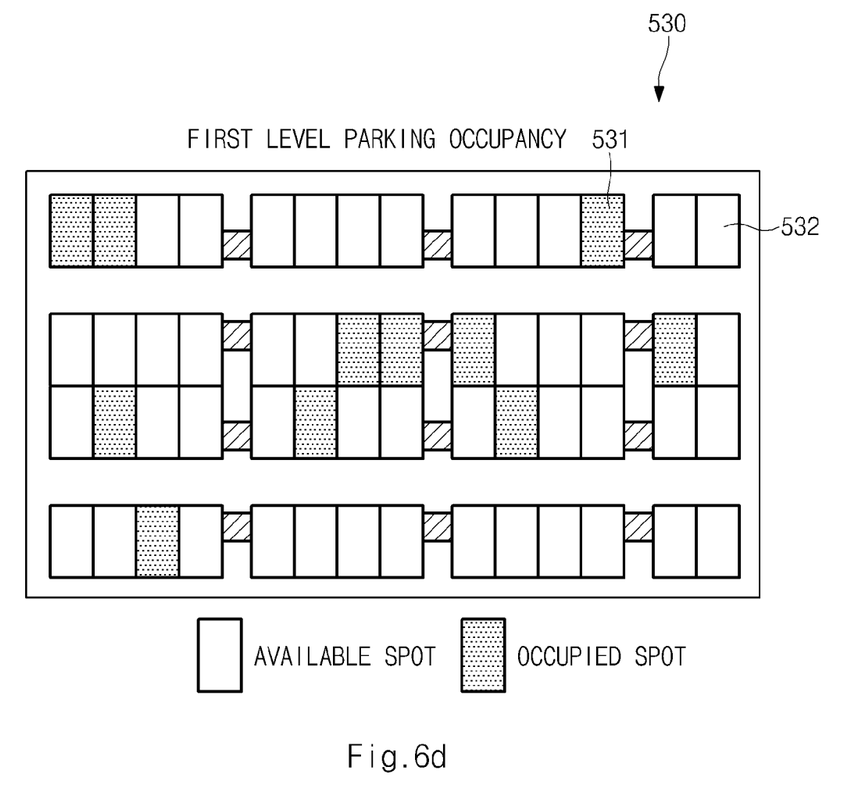
Figure 6E:
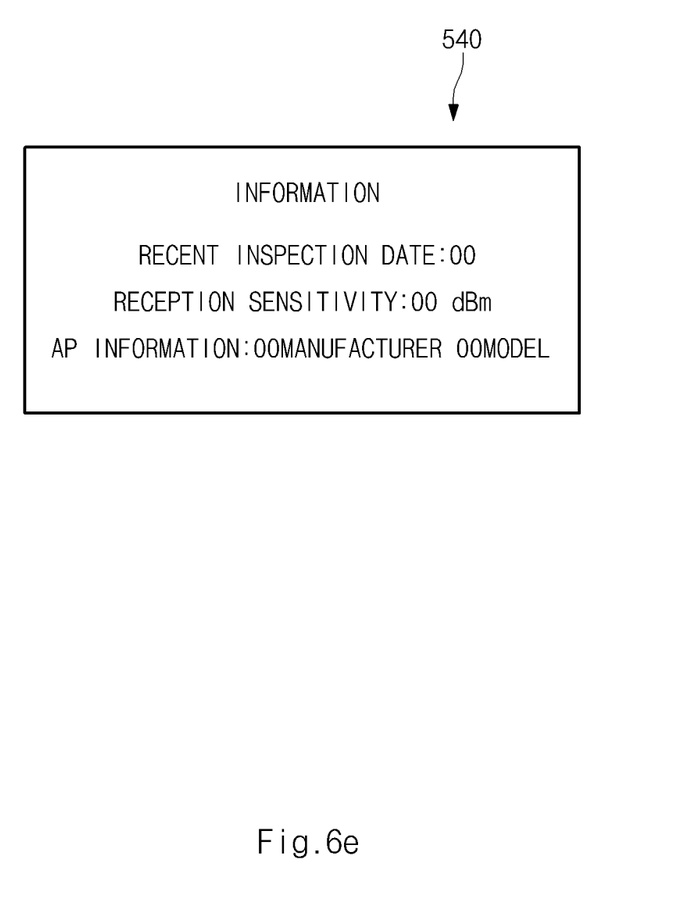

In FIG. 6C, the screen 520 for parking information pertaining to each level displays the number of parking spaces available of a total number of parking spaces for each level so that a driver may easily identify a parking space occupancy status of a multi-level parking structure. When the 'event information' in the screen of FIG. 6A is clicked or any level B1, B2, B3 and B4 in the screen of FIG. 6C is clicked, the detailed screen 530 shows the parking space occupancy status, as shown in FIG. 6D. As illustrated in FIG. 6D, the parking space occupancy status screen indicates all parking spaces on a corresponding level, wherein an occupied space 531 is marked in a first color, e.g., as red and an empty space 532 is marked in a second color, e.g., as white. The information service screen 540 in FIG. 6E displays information such as, for example, reception sensitivity, inspection date, and manufacturer of the access point (AP) 400. When a driver touches the on/off button screen 550 to stop receiving parking information, a screen is turned off.

Figure 7A:
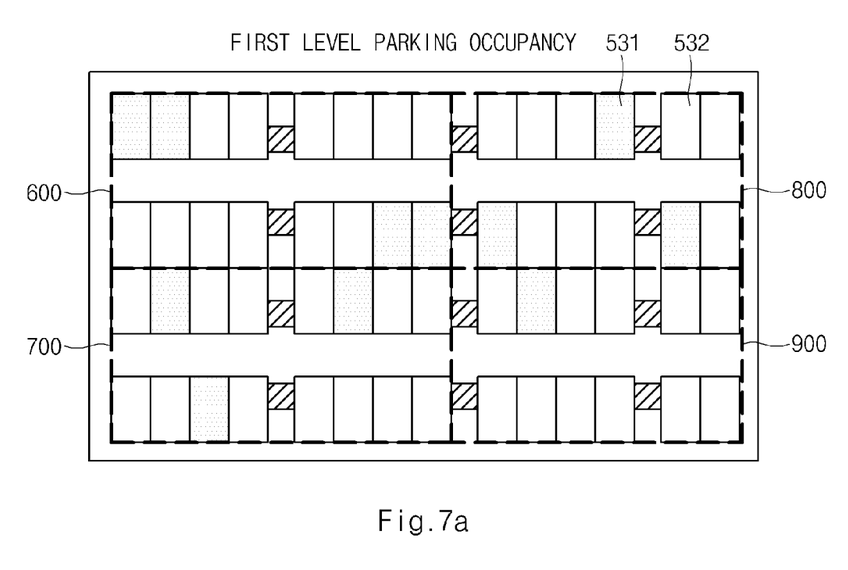
FIGS. 7A and 7B are detailed views of a screen showing parking space occupancy status of FIG. 5.
Figure 7B:
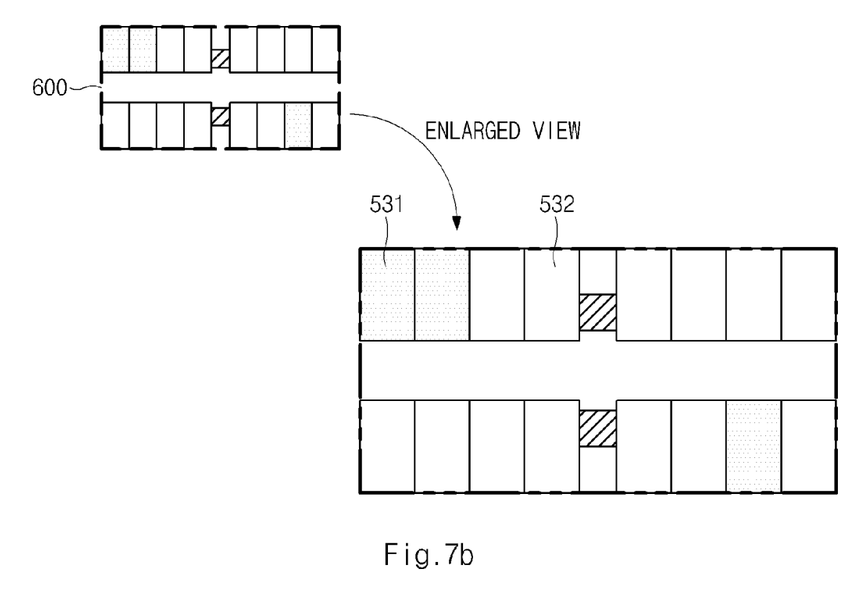

Here, when the detailed screen 530 shows a parking space occupancy status screen, which is divided into subsections 600 to 900 as shown in FIG. 7A, and one of the subsections 600 to 900 of the parking space occupancy screen is selected by a driver touching the screen, an enlarged view of the sleeted subsection, for example, subsection 600 is displayed so that the driver may easily identify the parking space occupancy, as shown in FIG. 7B.

The vehicle information center 200, in association with the parking control server 300, collects and stores the parking information. To this end, the vehicle information center 200 includes a parking information storage unit 220 and a control unit 230.

The parking information storage unit 220 stores the parking information received from the parking control server 300. When the control unit 230 receives a request for the parking information from the vehicle terminal 100, the control unit 230 transmits the parking information sorted in the parking information storage unit 220 to the vehicle terminal 100.

The parking control server 300 includes a parking information supply unit 310, which supplies the parking information detected by a parking detection sensor to the vehicle information center 200 or the vehicle terminal 100, and the parking detection sensor 320 for detecting parking space occupancy in the parking structure. Here, the parking control server 300 receives the parking information from a corresponding parking site such as a shopping mall or public institutions and transmits the parking information to the vehicle information center 200 or the vehicle terminal 100.

Hereinafter, referring to FIG. 3, a method of providing parking information based on dual wireless communication according to an exemplary embodiment of the present invention will be described.

First, when the parking information request is generated by a user (S110), the vehicle terminal 100 within a vehicle attempts to establish a communication connection with the vehicle information center 200 via CDMA (S120). Accordingly, the vehicle information center 200 sends a communication response to the vehicle terminal 100 (S130). Here, the control unit 120 provides a start screen such as shown in FIG. 4 for receiving the parking information request when the vehicle enters into the parking lot and, when the user selects 'YES,' the control unit 120 determines the parking information request as being generated.

The vehicle terminal 100 verifies if the communication connection is established (S140) and, if the communication connection is established, sends a request for the parking information to the vehicle information center 200 via CDMA (S150). Accordingly, the vehicle information center 200 transmits parking information of a corresponding parking site to the vehicle terminal 100 (S160). Here, the vehicle information center 200 obtains information about the parking site in which the vehicle terminal 100 is located by using location information of the vehicle terminal 100 and transmits the parking information of the corresponding parking site to the vehicle terminal 100. Accordingly, the vehicle terminal 100 displays the received parking information on a screen (S200).

Alternatively, when the communication connection via CDMA is not established in step S140, the vehicle terminal 100 performs a handover to WiFi so that the parking information request is sent to the parking control server 300 via WiFi instead (S180). Accordingly, the parking control server 300 transmits the parking information to the vehicle terminal 100 via WiFi (S190) and the vehicle terminal 100 displays the received parking information on a screen (S200). Although a process of performing handover to WiFi is described in steps S170 through S190, it should be noted that any wireless communication network other than CDMA, for example, WiBro can be utilized for hand-over purposes.

Thus, in the present invention, CDMA connection can be set as default so that a communication connection to the vehicle information center 200 is attempted via CDMA when a wireless communication network connection request is generated by the user. If a response is not received within a predetermined period of time, it is determined that CDMA has failed, e.g., because it is experiencing a large surge in a data traffic or a current location has weak signal strength, and a direct communication connection to the parking control server 300 is attempted via another communication network such as, for example, WiFi or WiBro.

Figure 3:
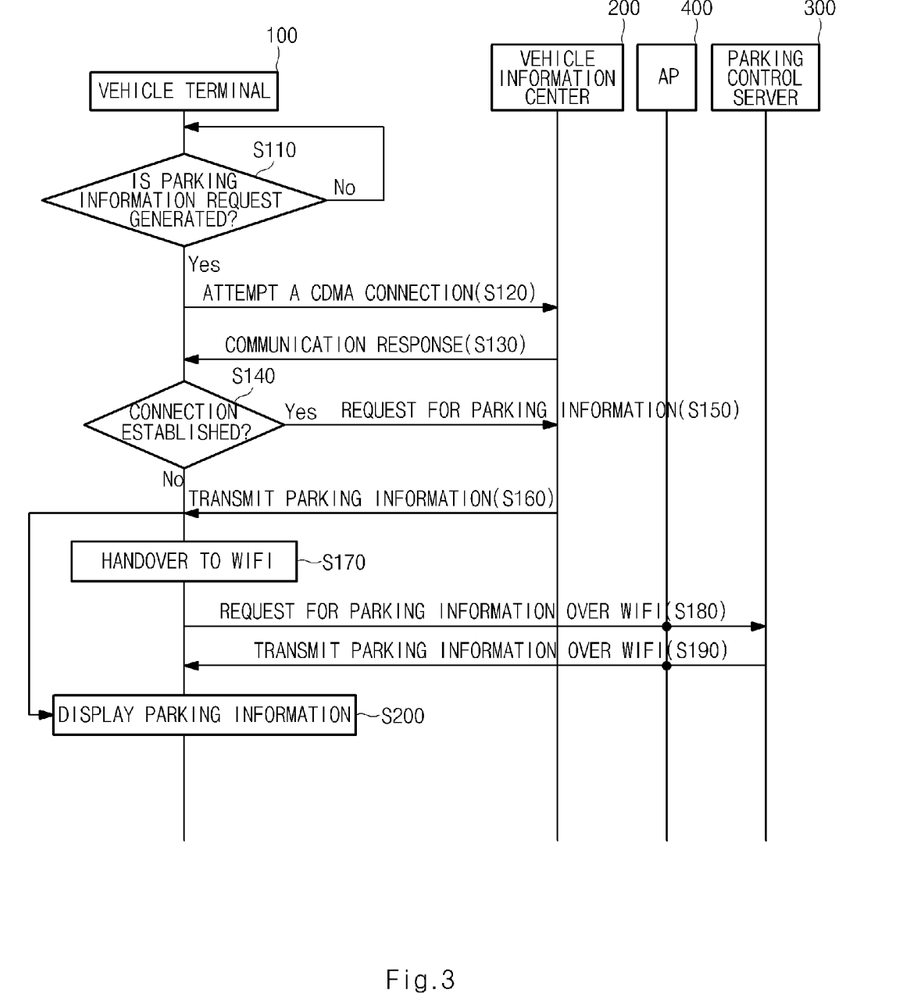
FIG. 3 is a flowchart diagram illustrating a method of providing parking information based on dual wireless communication according to an exemplary embodiment of the present invention.
Figure 4:
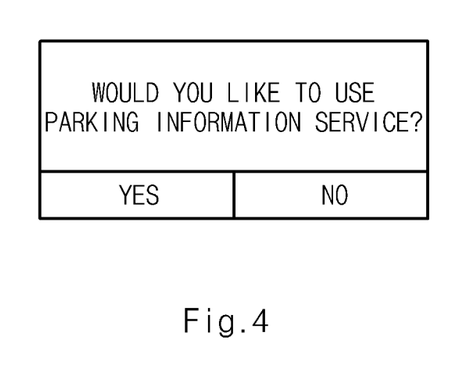
FIG. 4 illustrates an example of a start screen of a parking information service.

Also, in FIG. 3, an example is illustrated in which the communication connection is attempted via CDMA, which is set as default, and a handover is performed to WiFi if the communication connection fails; however, a list of wireless communication networks available to the vehicle terminal 100 can be displayed on a screen so that a user may select one of the wireless communication networks to request the parking information over the selected wireless communication network.

In addition, when WiFi is set as default, the communication connection is attempted by the vehicle terminal 100 via WiFi upon receiving the wireless communication network connection request from the user. If a response is not received within a predetermined period of time, the communication connection can be attempted via another communication network such as, for example, CDMA or WiBro.

Further, in FIG. 3, parking information is provided without requiring a user authentication process. However, in an alternative embodiment, the vehicle information center 200 or the parking control server 300 may perform user authentication to provide the parking information only to users who subscribe to a parking information service.

Further, in the present embodiments, it is described that the parking control server 300 is connected via WiFi; however, it should be noted that the parking information can also be received from the vehicle information center 200 by connecting to the vehicle information center 200 via WiFi.

According to the present invention described above, parking information can be provided to a driver by selectively using code division multiples access (CDMA) and WiFi, thereby enhancing user convenience.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A system for providing parking information based on dual wireless communication, the system comprising:
    a vehicle terminal configured to connect to a server via a first wireless communication network when a parking information request is generated, and configured to connect to the server via a second wireless communication network if a connection via the first wireless communication network fails, thereby receiving and displaying the parking information on a screen,
    wherein the vehicle terminal includes a display unit configured to display on a screen parking information received from the server, the parking information including announcement information, parking information of each level, and detailed information of a selected level listed in the parking information of each level,
    wherein announcement information, parking information of each level, and detailed information of a selected level listed in the parking information of each level are displayed on the screen at the same time, and
    wherein the detailed information is divided into a plurality of subsections and the display unit is configured to display an enlarged view of a subsection selected by a user.

2. The system of claim 1, wherein the first wireless communication is code division multiples access (CDMA) and the second wireless communication is WiFi.

3. The system of claim 2, wherein the server determine, upon receiving the parking information request from the vehicle terminal, whether a user is a subscriber to a parking information service.

4. The system of claim 1, wherein the vehicle terminal further comprises:
    a wireless communication unit configured to perform a wireless communication with the server via at least one of a group consisting of CDMA, WiFi and WiBro; and
    a control unit configured to perform a handover to the at least one of a group consisting of CDMA, WiFi and WiBro.

5. The system of claim 1, wherein the announcement information includes an address of a parking site, a total number of spaces, a service provider and event information.

6. The system of claim 1, wherein, in the detailed information of the selected level, an available parking space is marked as white and an occupied parking space is marked as red.

7. The system of claim 1, wherein the server determine, upon receiving the parking information request from the vehicle terminal, whether a user is a subscriber to a parking information service.

8. A method of providing parking information based on dual wireless communication, the method comprising:
    sending a request for parking information to a server via a first wireless communication network when a parking information request is generated;
    sending the request for the parking information to the server via a second wireless communication network if a connection via the first wireless communication network is failed; and
    displaying, on a screen, the parking information received from the server,
    wherein the parking information includes announcement information, parking information of each level, and detailed information of a selected level listed in the parking information of each level, wherein announcement information, parking information of each level, and detailed information of a selected level listed in the parking information of each level are displayed on the screen at the same time, and wherein the detailed information is divided into a plurality of subsections and the display unit is configured to display an enlarged view of a subsection selected by a user.

9. The method of claim 8, wherein the first wireless communication is CDMA and the second wireless communication is WiFi.

10. The method of claim 8, wherein, in the detailed information of the selected level, an available parking space is marked as a first color and an occupied parking space is marked as a second color.

11. The method of claim 8, wherein the announcement information includes an address of a parking site, a total number of spaces, a service provider and event information.

* * * * *